No. 674,784. Patented May 21, 1901.
E. MAJOR.
SUPPORT FOR BICYCLES.
(Application filed Jan. 15, 1901.)
(No Model.) 3 Sheets—Sheet 2.
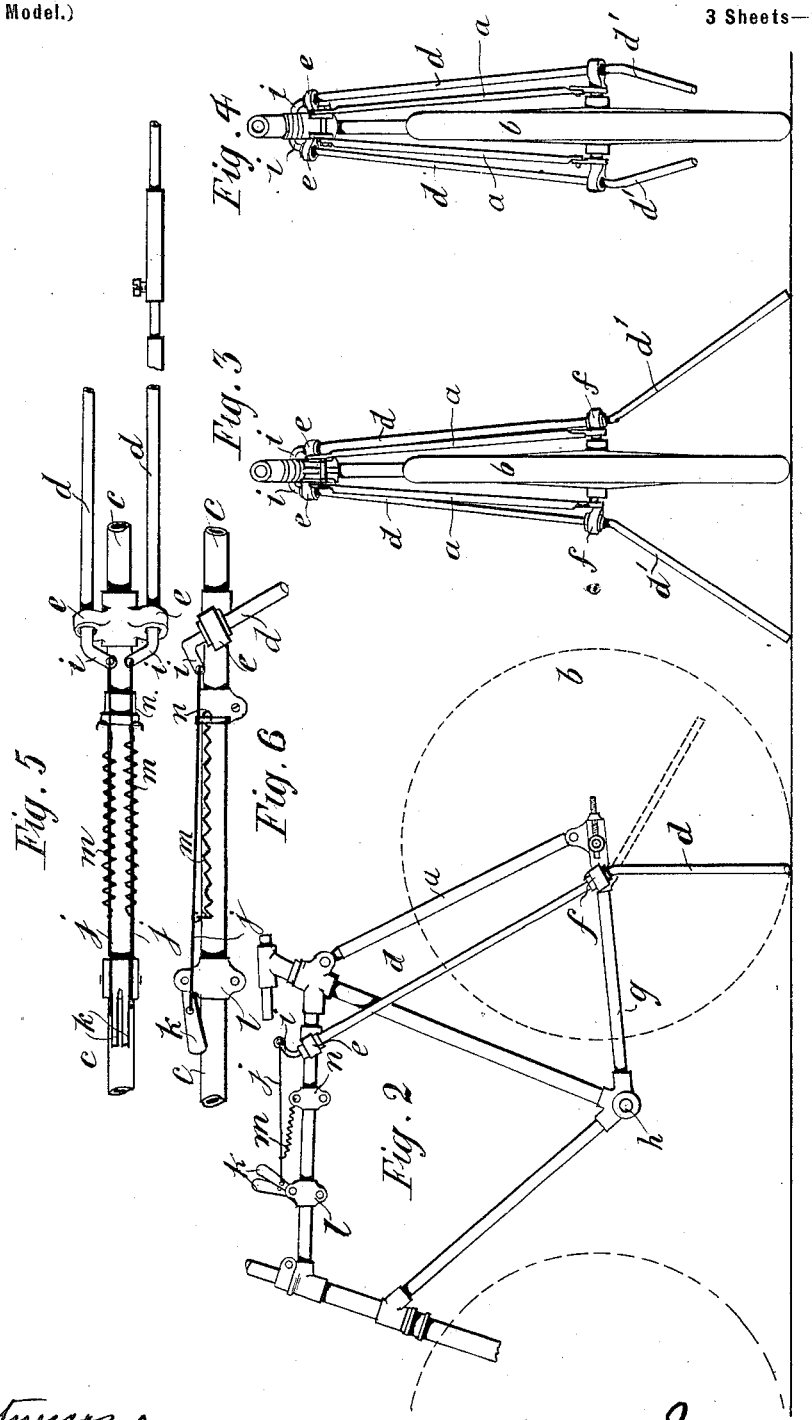

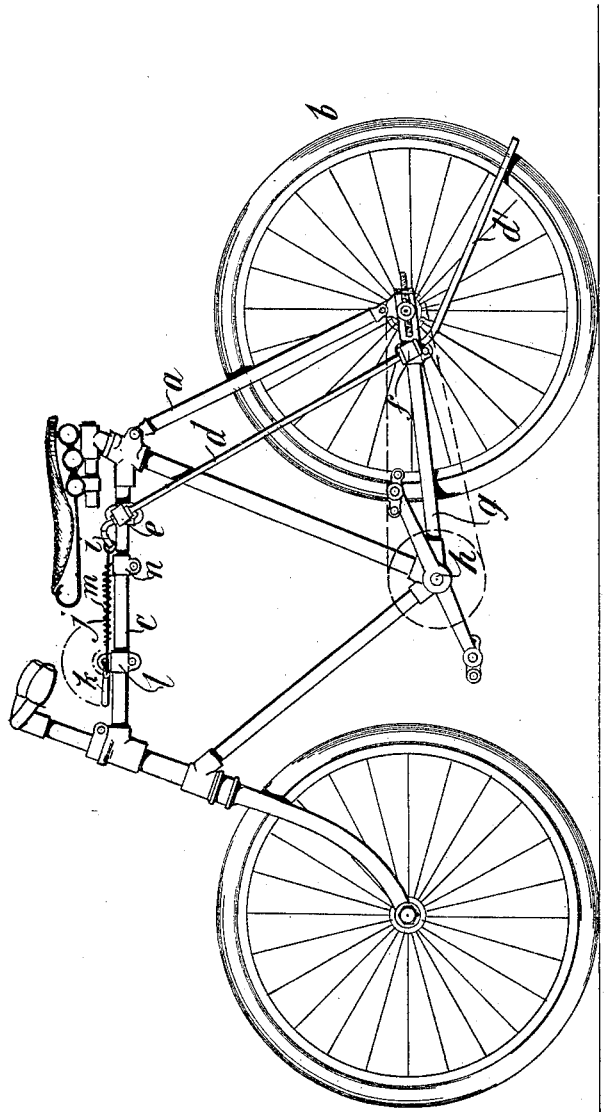

No. 674,784. Patented May 21, 1901.
E. MAJOR.
SUPPORT FOR BICYCLES.
(Application filed Jan. 15, 1901.)
(No Model.) 3 Sheets—Sheet 3.
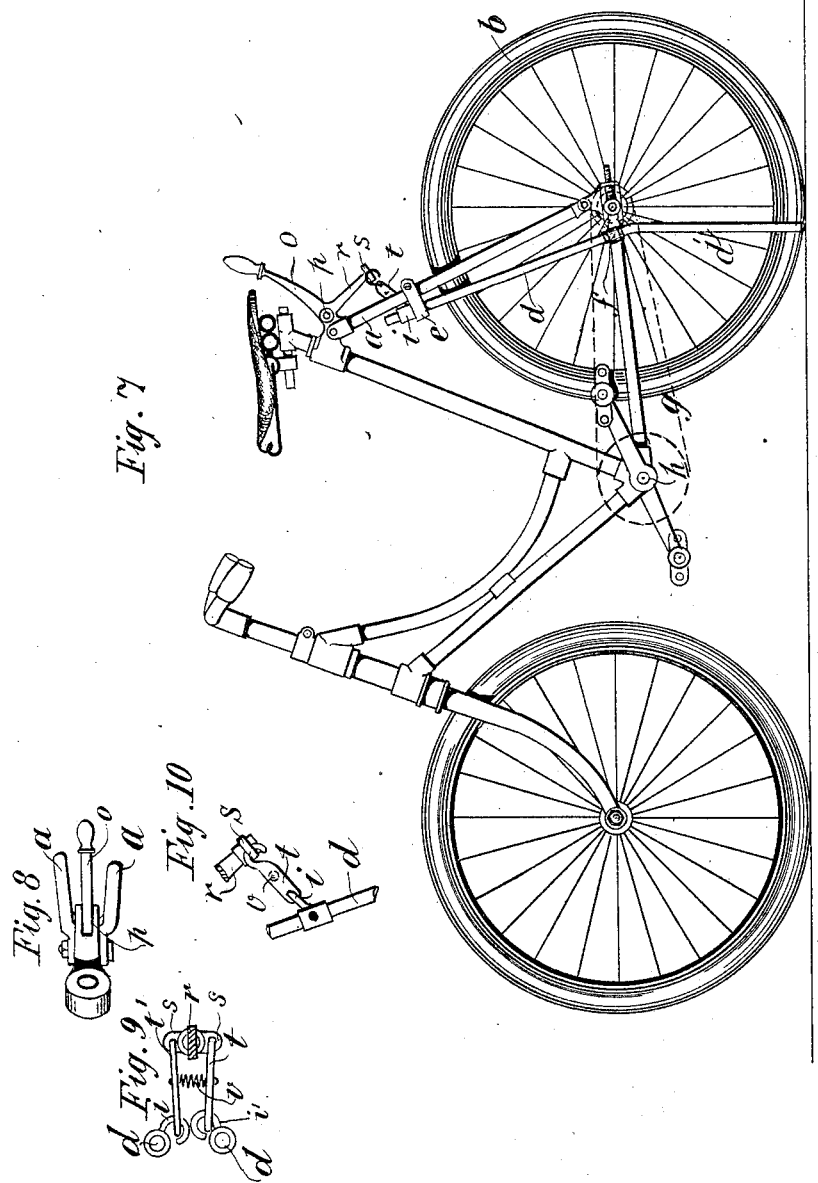

UNITED STATES PATENT OFFICE.

ERNEST MAJOR, OF COOKHAM DENE, ENGLAND.

SUPPORT FOR BICYCLES.

SPECIFICATION forming part of Letters Patent No. 674,784, dated May 21, 1901.

Application filed January 15, 1901. Serial No. 43,398. (No model.)

*To all whom it may concern:*

Be it known that I, ERNEST MAJOR, a subject of the Queen of Great Britain, residing at Cookham Dene, in the county of Berks, England, have invented certain new and useful Improvements in Supports for Bicycles, of which the following is a specification.

My invention relates to supports for the bicycles ordinarily used, the object of the improved support being to retain the bicycle in a vertical position, if desired, when at rest, so that a rider can safely stop for any length of time he may wish without dismounting or after having dismounted can leave his bicycle standing alone in the road or on the pavement without fear of its upsetting, while when the machine is traveling the support is moved out of the way and is in no way inconvenient, the device being very simple, light, cheap, and easily applied and used, and not likely to get out of order. The improved support can also be used with advantage by learners and others to aid them in mounting and dismounting from the bicycle. I attain these objects by the mechanism illustrated in the accompanying drawings, in which—

Figure 1 is a side view of a bicycle having my invention applied to it, the supports being turned up and inoperative. Fig. 2 shows part of the same bicycle with the supports turned down so as to come into action. Fig. 3 is a back view of Fig. 2, and Fig. 4 is a back view of Fig. 1. Fig. 5 is a plan, and Fig. 6 a side view, upon a larger scale, of the form of operating-gear shown in the other figures. Fig. 7 is a side elevation showing a slight modification of the device for use on bicycles for ladies. Fig. 8 is a detail plan view of the handle for operating the same. Figs. 9 and 10 are detail views of the connection between the supports and the handle.

Similar letters refer to similar parts throughout the several views.

I arrange somewhat in front of the inclined fork $a$ of the frame of the bicycle, which extends from the center of the rear or driving wheel $b$ to the back end of the horizontal top bar $c$ of the frame, a light metal rod or spindle $d$, (which may be tubular,) the upper end of which passes through and turns in a guiding-eye $e$, screwed or fixed upon the side of the upper horizontal top bar $c$, while its lower end turns in a similar guide $f$, attached to the lower horizontal or nearly horizontal part of the frame which extends at each side of the wheel $b$ from the driving-axle to the pedal-axle bearing $h$. The lower end of the bar $d$, turning as described, has a diagonal arm $d'$, attached to or forming part of it, but at such angle that when turned outward into a plane at or near right angles with the vertical plane of the center of the bicycle its outer end touches and rests upon the ground, as shown in Figs. 2 and 3, while when the bar $d$ is turned around in its bearings or guiding-eyes $e\ f$ its diagonal arm $d'$ is brought into a position more or less parallel with the driving-wheel $b$, its end being raised to a considerable distance from the ground, as shown in Figs. 1 and 4, and its point lying out of the way near the side of the wheel $b$. When turned down, therefore, it forms a very simple and convenient support to retain the bicycle in or nearly in an upright position, while when turned up it is quite out of the way.

I have described a movable arm at one side of the bicycle; but I prefer to have a similar one upon each side, as shown in the drawings, in order that the bicycle may stand upright and perfectly safely and firmly in all circumstances.

Instead of the support consisting, as above described, of a rod $d$, turning in bearings at its upper and lower ends and having its lower part $d'$ inclined angularly outward, it may consist of a frame formed, for example, by adding a sufficiently strong diagonal stay connecting the upper end of the rods $d$ with the outer end of the bent-out part $d'$. Intermediate trussing may also be used to give additional strength. It is understood that the top and bottom bearings $e$ and $f$, in which the rod $d$ turns, are fixed in such positions and standing out to such a distance from the frame of the bicycle that they carry the rod $d$ exactly in the position required to keep it clear of the parts of the bicycle and also to allow the lower bent arm $d'$ to take the position, when opened out and when closed, best adapted for the purpose which it is intended to serve. Instead of the bearings standing out from the side of the frame they may be made close to the latter, projections being formed at the side of the rod $d$, carrying at their ends pins fitting in the bearings.

The upper end of the bar $d$ has attached to it, in a convenient position, a handle or device by which the rod can be quickly and easily turned around, as described, and I arrange springs or other catches, of any of the well-known kinds, by which the handle can be retained sufficiently firmly in either of its two positions—that is to say, when the support is turned out, as shown in Fig. 2, and when it is closed in near the wheel, as shown in Fig. 1—but capable of yielding sufficiently if the bicycle is moved when the support is resting on the ground. It is to be understood that the supports upon the sides of the wheel $b$ can be operated and used together or independently.

One method of operating the rod $d$ is illustrated in the several views, Figs. 1, 2, 3, 4, 5, and 6. $i$ is a short lever formed or fixed at a suitable angle upon the upper end of the rod $d$. A wire or light rod $j$ connects the end of the lever $i$ with a lever or handle $k$, hinged upon a support $l$, fixed upon the bar $c$ of the frame of the machine. $m$ is a spring attached at one end to the rod $j$ and at the other end to a bracket or attachment $n$ upon the bar $c$. When the handle $k$ is turned down, as shown in Figs. 1, 4, 5, and 6, the supports $d'$ are raised from the ground. When the handle is turned up, as shown in Figs. 2 and 3, the supports $d'$ are brought down to the ground and are kept in position by the elastic tension of the spring $m$, which nevertheless allows the end of the support to rise if necessary. It is understood that a separate lever $i$, rod $j$, handle $k$, and spring $m$ are used for each support, and that one of the handles only may be used at once or both simultaneously. Instead of the devices for the purpose described and shown other equivalent ones may be used.

The supporting-bars $d'$ may be of wood or other suitable material fitted upon the bars $d$. The bars $d$ may be adjustable in length, as shown in Fig. 5.

If it is desired that the rider should be able to regulate the position of the supports without removing his hand from the handle-bar, the handles described upon the rods may be connected by a wire or cord to a supplementary handle or short lever resembling that ordinarily used for operating the brake; also, where my invention is to be applied to bicycles for ladies the top and bottom supports for the bar $d$ are arranged in the most convenient position on the frame, the handle by which they are operated being connected with them by a lever and connecting-links out of the way of the rider's dress. A method of carrying out this construction (which may also be used for bicycles for gentlemen) is illustrated in Figs. 7, 8, 9, and 10.

$o$ is a handle arranged behind the saddle and turning upon a center $p$ upon the frame.

$r$ is an arm upon the handle, having fitted upon a pin at its end a cross-bar $s$, to which are jointed two links $t\ t'$, the other ends of which are jointed to the ends of the short levers $i\ i'$ upon the upper ends of the bars $d$, which turn in bearings $e\ f$, carried by the frame of the machine and have their lower ends bent out at $d'$ to form the supports.

$v$ is a spring compressed between the links $t\ t'$ and tending to separate them, so that the bars $d$ are firmly held in position both when opened out and closed together.

The details of construction and arrangement may be varied more or less to suit different circumstances, and the methods of construction described allow the rods $d'\ d'$ to rest upon the ground at different heights. For instance, the inclined rods $d$ may be arranged in any convenient suitable position upon the frame of the bicycle, either behind or in front of the fork $a$, so long as the upper support or eye $e$ is fixed upon the upper part of the frame of the machine and the lower support or eye $f$ upon the lower part of the said frame in order that the distance between the two supports may be sufficient to insure the steadiness of the rods $d$ and of the bicycle itself when the inclined ends $d'$ are upon the ground.

What I claim as my invention, and desire to secure by Letters Patent, is—

1. In a bicycle-support the combination with clips secured to the frame of the bicycle, a supporting-rod journaled in said clips and having its lower end bent at an angle; of a handle pivoted to the frame of the bicycle, a link connecting said handle with said rod, and a spring connected with said link tending to hold said rod in operative position, substantially as described.

2. In a bicycle-support the combination with clips secured to the frame of the bicycle, supporting-rods journaled in said clips and bent at an angle; of a handle pivoted to the frame of the bicycle, links connecting said handle with said rods, and a spring connected with said links tending to hold said rods in operative position, substantially as described.

In witness whereof I have hereunto set my hand in the presence of two witnesses.

ERNEST MAJOR.

Witnesses:
ARTHUR ERNEST EDWARDS,
HERBERT ARTHUR MARSHALL.